(12) United States Patent
Hongnara et al.

(10) Patent No.: US 12,395,231 B2
(45) Date of Patent: Aug. 19, 2025

(54) REFLECT ARRAY, REFLECT ARRAY SYSTEM, COMMUNICATION SYSTEM, WALL MATERIAL WITH BUILT-IN REFLECT ARRAY, AND MOBILE COMMUNICATION SYSTEM

(71) Applicant: DKK Company, Limited, Tokyo (JP)

(72) Inventors: Tanan Hongnara, Tokyo (JP); Takayoshi Sasaki, Tokyo (JP); Yoshiki Shirasawa, Tokyo (JP); Hitoshi Onoda, Tokyo (JP); Katsumori Sasaki, Tokyo (JP); Keisuke Sato, Tokyo (JP); Ichiro Oshima, Tokyo (JP)

(73) Assignee: DKK Company, Limited, Tokyo (JP)

( * ) Notice: Subject to any disclaimer, the term of this patent is extended or adjusted under 35 U.S.C. 154(b) by 341 days.

(21) Appl. No.: 18/084,602

(22) Filed: Dec. 20, 2022

(65) Prior Publication Data
US 2024/0204858 A1 Jun. 20, 2024

(51) Int. Cl.
*H04B 7/145* (2006.01)
*H01Q 15/14* (2006.01)

(52) U.S. Cl.
CPC ........... *H04B 7/145* (2013.01); *H01Q 15/147* (2013.01)

(58) Field of Classification Search
CPC ........ H04B 7/145; H01Q 15/147; H01Q 3/46; H01Q 15/148
USPC .......................................................... 455/7
See application file for complete search history.

(56) References Cited

U.S. PATENT DOCUMENTS

| | | | |
|---|---|---|---|
| 6,388,620 B1 * | 5/2002 | Bhattacharyya | H01Q 1/288 343/913 |
| 9,620,862 B2 | 4/2017 | Maruyama et al. | |
| 11,689,263 B2 * | 6/2023 | Zimmerman | H01Q 3/267 375/299 |
| 2015/0022414 A1 | 1/2015 | Maruyama et al. | |
| 2019/0363448 A1 | 11/2019 | Yemelong et al. | |

(Continued)

FOREIGN PATENT DOCUMENTS

| | | |
|---|---|---|
| EP | 2 390 957 A1 | 11/2011 |
| EP | 3 961 815 A1 | 3/2022 |

(Continued)

OTHER PUBLICATIONS

Amendments received before examination for EP4346010 dated Jun. 12, 2024 European Patent Application 22208460.0 (Year: 2024).*

(Continued)

*Primary Examiner* — Juan A Torres
(74) *Attorney, Agent, or Firm* — Faegre Drinker Biddle & Reath LLP

(57) ABSTRACT

Provided is a reflect array that enables reflectance at a plurality of angles of incidence while maintaining a high gain without causing a decrease in the electric field intensity of a reflector plate, and that can simplify the installation of the reflect array. In the reflect array, a plurality of first elements and a plurality of second elements are arranged on XY plane. The first elements are arranged in Y direction to form a first row of elements. The second elements are arranged in Y direction to form a second row of elements. The first element rows and the second element rows are alternately arranged in X direction. The two angles of maximum reflectance are on the same positive or negative side of X-axis.

13 Claims, 10 Drawing Sheets

(56) References Cited

U.S. PATENT DOCUMENTS

2024/0347911 A1* 10/2024 Ai .................... H01Q 21/24

FOREIGN PATENT DOCUMENTS

JP       2020-509687 A    3/2020
JP       2021-048465 A    3/2021

OTHER PUBLICATIONS

Amended description with annotations for EP4346010 dated Jun. 12, 2024 European Patent Application 22208460.0. (Year: 2024).*
Amended claims with annotations for EP4346010 dated Jun. 12, 2024 European Patent Application 22208460.0. (Year: 2024).*
European search opinion for EP4346010 dated Nov. 16, 2023 European Patent Application 22208460.0. (Year: 2023).*
Hongnara, Tanan, et al., "Reflect Array, Reflect Array System, Communication System, Wall Material With Built-In Reflect 5 Array, and Mobile Communication System," Japanese Patent Application No. 2021-127298 filed Aug. 3, 2022, with partial English translation.
Partial European Search Report issued Aug. 14, 2023 in Application No. 22208460.0.
Notification of Reasons for Refusal mailed Apr. 9, 2025 for Japanese Patent Application No. 2021-127298.

* cited by examiner

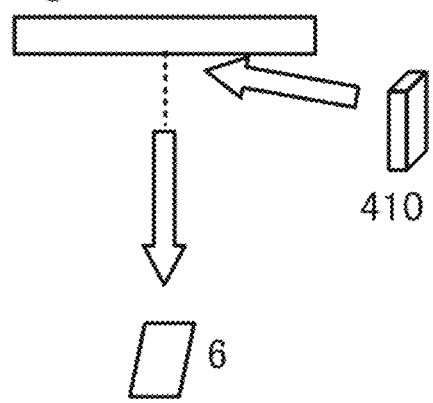
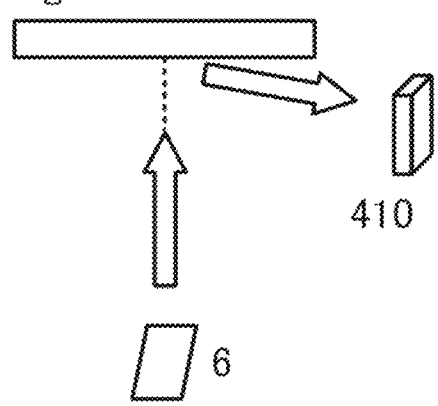
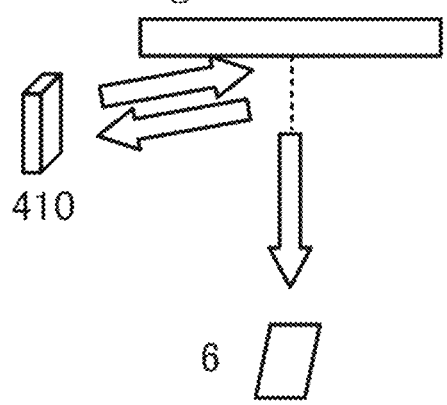

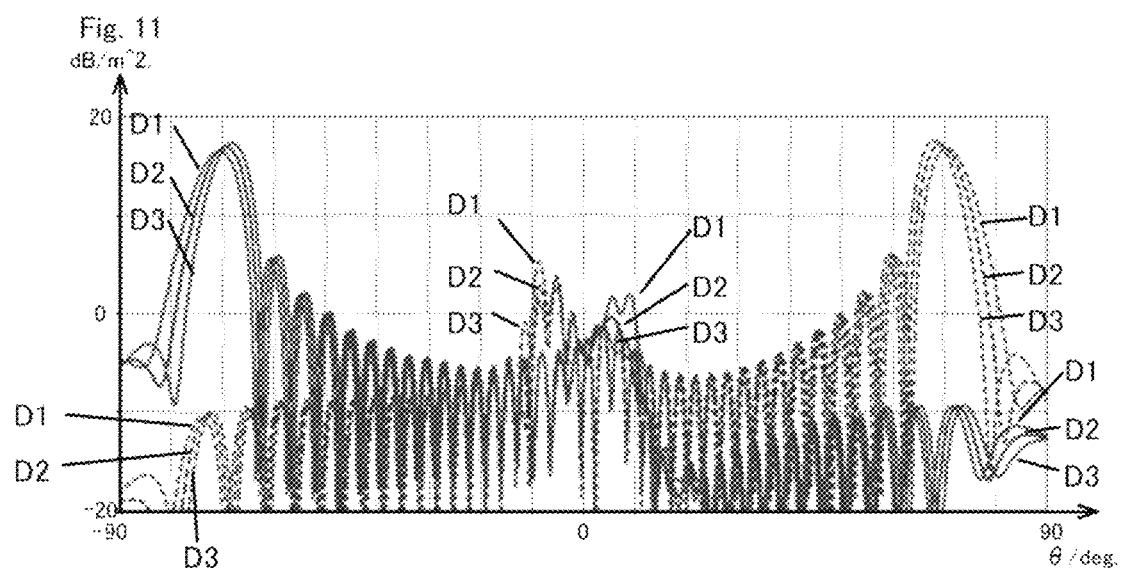
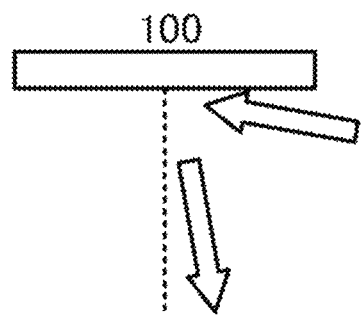
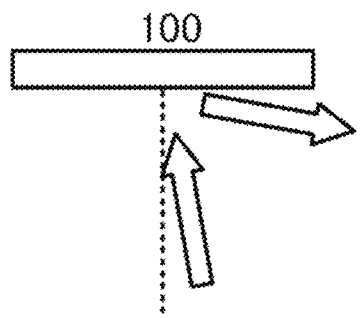

REFLECT ARRAY, REFLECT ARRAY SYSTEM, COMMUNICATION SYSTEM, WALL MATERIAL WITH BUILT-IN REFLECT ARRAY, AND MOBILE COMMUNICATION SYSTEM

TECHNICAL FIELD

The present invention relates to a reflect array, a reflect array system, a communication system, a wall material with built-in reflect array, and a mobile communication system.

BACKGROUND ART

In a mobile communication system, communication signals are transmitted and received as radio waves between base stations and communication terminals. Since the number of base stations is limited, there are areas where it is difficult for radio waves to reach directly from the base stations. Reflect arrays are sometimes used to solve this problem.

Conventional reflect array reflectors can be designed with arbitrary angles of incidence and reflectance.

Patent literature 1 describes a metasurface reflector, and a traffic signal apparatus provided with the metasurface reflector.

PRIOR ART

Patent Literature

Patent Literature 1 Japanese Patent Laid-Open No. 2021-48465

SUMMARY OF THE INVENTION

Problems to be Solved by the Invention

In a case where the reflect array reflector is designed with angles of incidence and reflectance determined in one direction each, the incident wave is reflected well for forward incidence as shown in FIG. 1 and for reverse incidence as shown in FIG. 2, with enough electric field strength of the reflected wave.

However, the installation position and the installation angle of the reflector depend on the position of the base station equipment and are uniquely determined, such that the reflector does not operate correctly for incident waves in angles different from the designed angle, as shown in FIG. 3.

Since the reflector must be installed facing in the direction to the base station, it is a strong constraint when installing the reflector.

When the incident wave, or the reflected wave, is designed to have a plurality of angular directions as shown in FIGS. 4, 5, and 6, the constraints on the installation position or the installation angle, etc. are relaxed, but the electric field in the desired direction is weaker compared to the normal case where angles of incidence and reflectance determined in one direction each.

For example, for both forward incidence shown in FIG. 4 and reverse incidence shown in FIGS. 5, and 6, electric waves are reflected not only to the directions to the communication devices or the base stations, but also to the other directions, such that the gain of reflectance is reduced compared to the case where only one angle of reflectance is designed.

Thus, when high electric field strength or reflected wave is required, in a configuration in which the reflected wave is concentrated in one direction for one incident direction, it is necessary to accurately match the installation position and direction of the reflector with the direction of the base station. Therefore, it is difficult to install a reflector unless the position of the base station equipment is determined in advance.

In addition, in a configuration in which the incident wave or the reflected wave is designed in a plurality of angular directions in advance, the electric field strength of the reflected wave is reduced.

Therefore, it is an object of the present invention is, to provide a reflect array that enables reflectance at a plurality of incident angles or reflection angles while maintaining a high gain in a reflect array, or a reflector, without causing a decrease in the electric field strength of the reflector, and the reflect array that can be easily installed.

In another aspect, it is also an object of the present invention is to provide a reflect array that achieves a plurality of incidence-reflectance angles without reducing directional gain.

In another aspect, it is also the object of the present invention is to provide a reflect array that simplifies the installation of the reflect array, or the metamaterial reflector.

Means for Solving the Problems

The reflect array in one embodiment of the present invention has,
  a plurality of first elements and second elements, arranged on XY plane, for three directions of X direction, Y direction, and Z direction, the three directions are orthogonal to each other,
  the first elements are arranged in the Y direction to form a first element row,
  the second elements are arranged in the Y direction to form a second element row, and
  the first element row and the second element row are arranged alternately, wherein,
  the two angles of the maximum incidence and the maximum reflectance are on the same positive or negative side of X-axis.

The reflect array in one embodiment of the present invention is
  the reflect array described above, characterized in that one of two angles of the maximum incidence and the reflectance is 1 degree to 30 degrees, and the other is 60 degrees to 89 degrees, with respect to the Z axis.

The reflect array in one embodiment of the present invention is the reflect array is characterized by being is formed as a deformable sheet that are configured to change its form.

The reflect array in one embodiment of the present invention has a fixing part for fixing the reflect array to outside of the reflect array.

The reflect array system in one embodiment of the present invention has the reflect arrays described above, wherein for an incidence-reflectance direction which is defined as the direction of a line where the XY plane intersects with a plane that contains the two directions of the maximum incidence and the maximum reflectance, the reflect arrays, with different incidence-reflectance directions from each other, are alternately arranged.

The reflect array system in one embodiment of the present invention has the reflect arrays described above, wherein for an incidence-reflectance direction which is defined as the direction of a line where the XY plane intersects with a plane that contains the two directions of the maximum incidence and the maximum reflectance, the reflect arrays, with 90 degrees different incidence-reflectance directions from each other, are alternately arranged.

The reflect array in one embodiment of the present invention has the reflect arrays described above, wherein for an incidence-reflectance direction which is defined as the direction of a line where the XY plane intersects with a plane that contains the two directions where the maximum incidence-reflectance is configured to occur, the reflect arrays, with different incidence-reflectance directions from each other by a predetermined angle, are alternately arranged, such that the incidence-reflectance directions of the reflect arrays differs by the predetermined angle.

The communication system in one embodiment of the present invention has base stations and the reflect array mentioned above, wherein the reflect array is installed between two of the base stations.

In the communication system in one embodiment of the present invention, a base station is provided on a wall surface, wherein the reflect array mentioned above or the above-described reflect array system mentioned above, is provided on a ceiling.

The communication system in one embodiment of the present invention, has a base station, wherein the reflect array mentioned above or the reflect array system mentioned above, is provided on a wall surface.

The communication system in one embodiment of the present invention has a base station, wherein the reflect array mentioned above or the reflect array system mentioned above, is provided on a floor.

The wall material with a built-in reflect array in one embodiment of the present invention, has a base material, and the reflect array mentioned above, or the reflect array system mentioned above.

The communication system in one embodiment of the present invention has a mobile receiver, and the reflect array mentioned above or the reflect array systems mentioned above, installed in a mobile body.

With the configurations mentioned above, periodic structure of the reflect array is substantially symmetrical, and two independent incidence-reflectance angles can be realized.

In usual cases, configuration for two beams to be independently reflected, has been required to achieve two types of incidence-reflectance angles, but the configuration causes decrease in gain. However, according to the configuration mentioned above, the two types of incidence-reflectance angles can be utilized independently in one configuration, so a high gain can be maintained.

In addition, reflect arrays are often installed outside, but usually, due to their poor design, they are often installed in an inconspicuous place, which greatly restricts the installation location.

This configuration with the periodic rows repeated improves design and the reflect array can be installed as it is even in places where people can see it, such as on ceilings, walls, and floors.

BRIEF DESCRIPTION OF THE DRAWINGS

FIG. 1 shows an example of a conventional reflect array.
FIG. 2 shows an example of a conventional reflect array.
FIG. 3 shows an example of a conventional reflect array.
FIG. 11 shows an example of intensity of incoming reflectance of a reflect array in one embodiment of the present invention.
FIG. 12 shows an example of incidence-reflectance of a reflect array in one embodiment of the present invention.
FIG. 13 shows an example of incidence-reflectance of a reflect array in one embodiment of the present invention.

DETAILED DESCRIPTION

Figure 4:
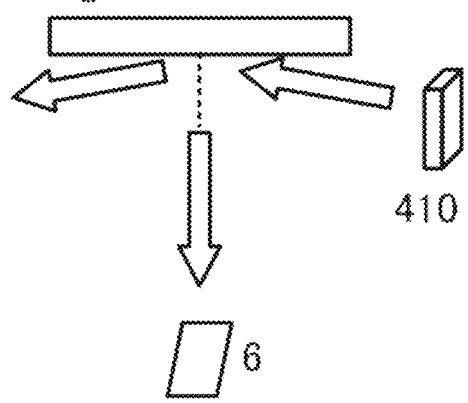
FIG. 4 shows an example of a conventional reflect array.
Figure 5:
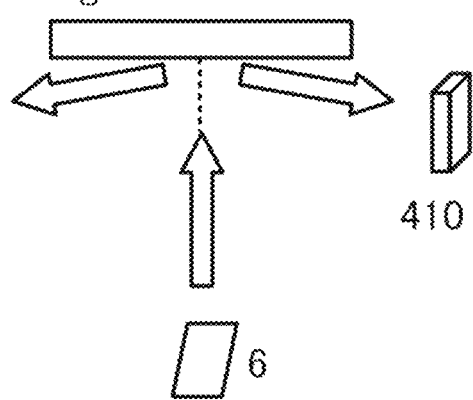
FIG. 5 shows an example of a conventional reflect array.
Figure 6:
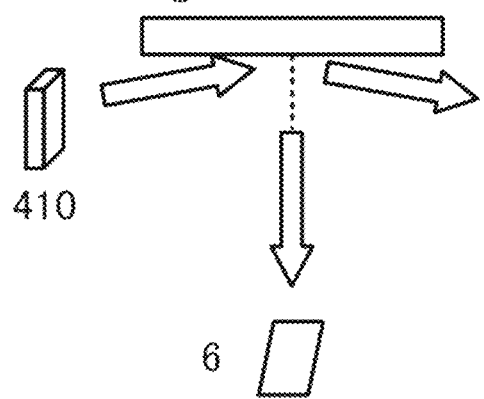
FIG. 6 shows an example of a conventional reflect array.
Figure 7:
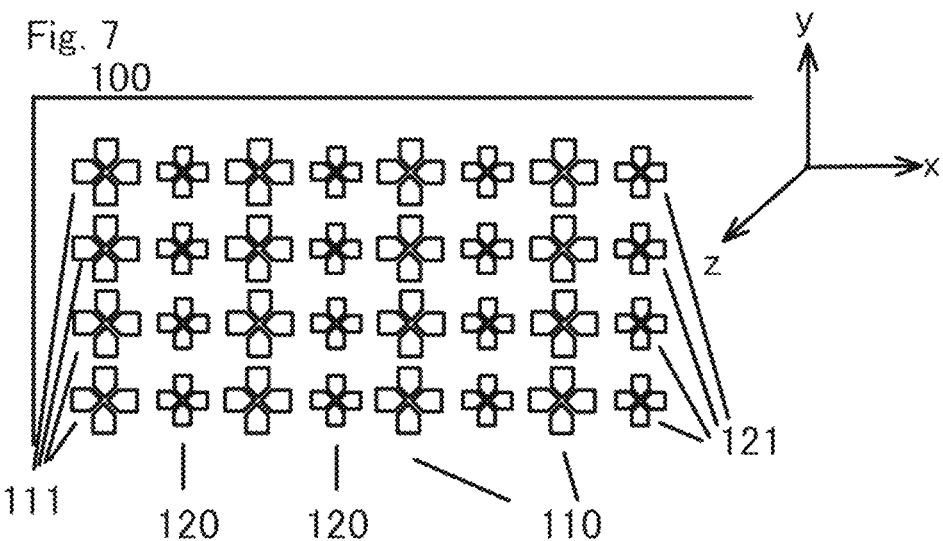
FIG. 7 shows a configuration of an example of a reflect array in one embodiment of the present invention.
Figure 8:
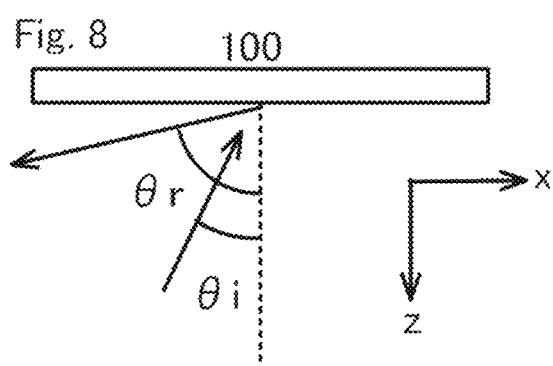
FIG. 8 shows a configuration of an example of a reflect array in one embodiment of the present invention.
Figure 9:
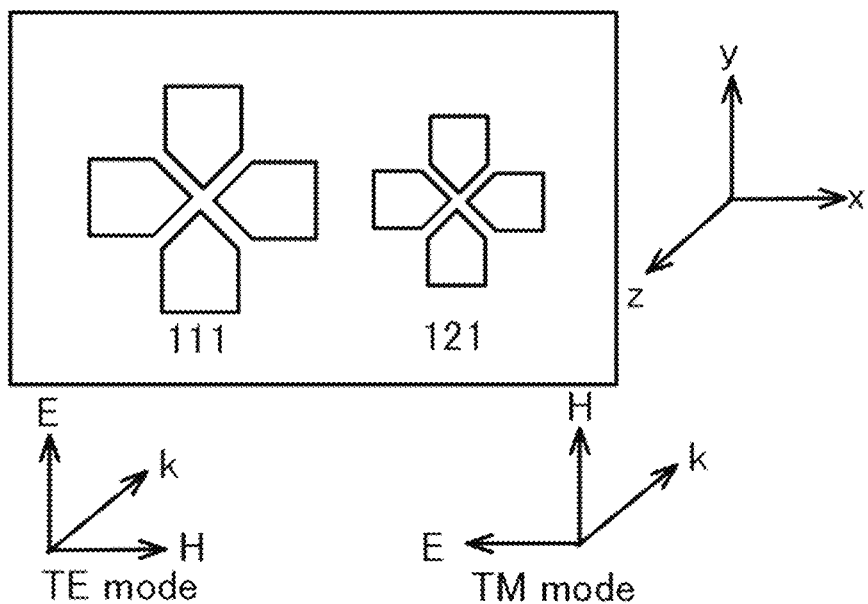
FIG. 9 shows a configuration of an example of a reflect array in one embodiment of the present invention.

FIGS. 7, 8, and 9 show an example of the reflect array in one embodiment of the present invention.

As shown in FIGS. 8 and 9, the three directions orthogonal to each other are X direction, Y direction, and Z direction. The X-axis, Y-axis, and Z-axis are the X-direction axis, Y-direction axis, and Z-direction axis, respectively.

As shown in FIG. 7, in the reflector 100, a plurality of first elements 111 and a plurality of second elements 121 are arranged on the XY plane. The first elements 111 are arranged in the Y direction to form a first element row 110 and the second elements are arranged in the Y direction to form a second element row 120. The first element rows 110 and the second element rows 120 are arranged alternately in the X direction. These elements form a metamaterial reflector.

As shown in FIG. 8, a designed angle of incidence and a designed angle of reflectance, that are the two angles in which maximum incidence and the maximum reflectance occur, are on the same positive or negative side of the X-axis. In the description and claims, "incident angle" or "angle of incidence" may mean an incident direction in addition to an incident angle. Similarly, "reflection angle" or "angle of reflectance" may mean a direction of reflectance in addition to an angle of reflectance. The same applies to the "designed angle of incidence", the "designed angle of reflectance", and the like.

In this embodiment, the designed angle of incidence is inclined by theta i from the vertical direction toward the negative direction of the horizontal direction. Here, the vertical direction is the Z direction and the horizontal direction is the X direction. Also, the designed angle of reflectance is in the negative direction of the X direction, and is inclined by theta r from the vertical direction.

Thus, the first element rows 110 and the second element rows 120 are alternately arranged in the X direction, such that the structure is substantially symmetrical in the X direction, that is, in the left and right direction. In the case where a plurality of lines are arranged in the horizontal direction, the designed angle of incidence is tilted from the vertical direction by theta i to the positive direction of the horizontal direction, at the same time the designed angle of reflectance is in the positive direction of the X direction and tilted by theta r from the vertical direction, similar operation can be realized.

As shown in FIG. 9, in this embodiment, the reflect array 100 has supercells 131. The plurality of supercells 131, each having a first element 111 and a second element 121 arranged in the X direction, are arranged in the X-axis direction and the Y-axis direction It is noted that the X direction and Y direction are approximate directions, so may be bent by about 10 degrees, or so.

With this configuration, a plurality of incidence-reflectance angles can be realized without reducing the directional gain of the reflect array 100.

Figure 10:
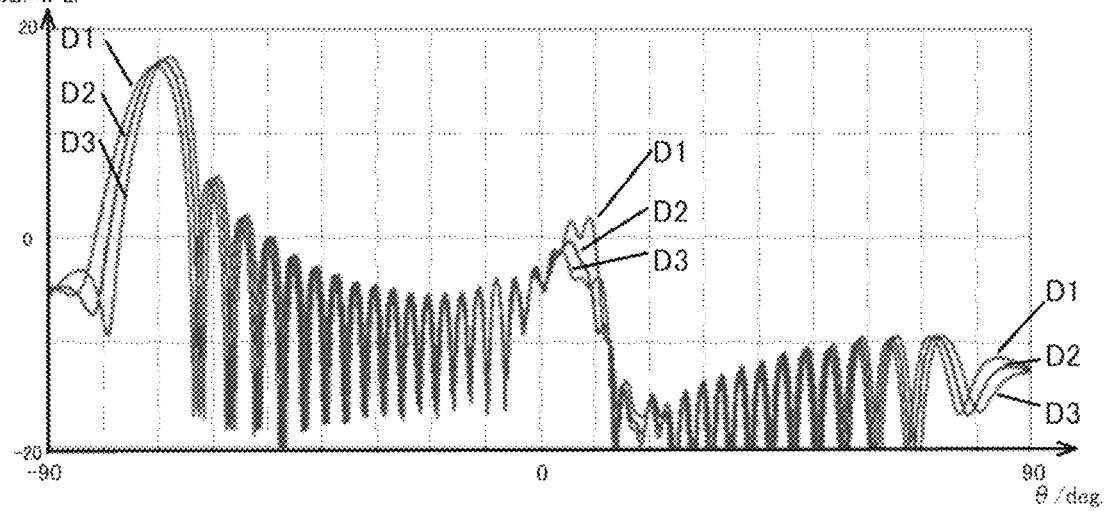
FIG. 10 shows an example of intensity of incoming reflectance of a reflect array in one embodiment of the present invention.
Figure 14:
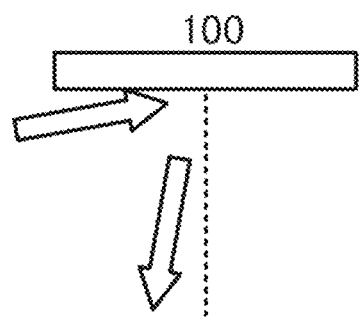
FIG. 14 shows an example of incidence-reflectance of a reflect array in one embodiment of the present invention.

FIGS. 10 and 11 show the intensity of the incoming reflectance in the above example. FIG. 12 shows reflectance of an incident wave in the forward direction. FIG. 13 shows reflectance of an incident wave in the reverse direction, which is opposite to the forward direction. FIG. 14 shows reflectance of an incident wave from the opposite side of the designed angle.

FIG. 10 shows the results at three frequencies D1, D2 and D3. D1 is equal to 0.93 multiplied by D2, while D3 is equal to 1.07 multiplied by D2. In this example, the angle of incidence is designed to be −10 degrees, that is minus 10 degrees, the solid line shows the results of incidence at −10 degrees, and the dashed line shows the results of incidence at +10 degrees.

As shown in FIG. 11, it exhibits good reflectance for both forward and reverse excitation. Moreover, as indicated by the dashed line in FIG. 11, the reflect array 100 operates similarly to incident waves from the opposite side of the designed angle, exhibiting good reflectance.

In one embodiment, it is desirable that the two angles that show the maximum incidence-reflectance are 1 degree to 30 degrees and the other is 60 degrees to 89 degrees with respect to the Z axis.

With the metamaterial reflector in which the first element rows 110 and the second element rows 120 are arranged alternately, it is easy to realize sufficient intensity of the transmission and reception of radio waves, necessary for communication.

In one embodiment, it is more desirable that the two angles that show the maximum incidence-reflectance are 5 to 20 degrees and 70 to 85 degrees with respect to the Z-axis.

With the metamaterial reflector, in which the first element array 110 and the second element array 120 are alternately arranged, it is easier to realize the incident and reflected radio waves to be further concentrated, and to realize the transmission and reception of radio waves of sufficient intensity necessary for communication.

In one embodiment, the reflect array 100 may be formed as a deformable sheet. Though the incidence and reflectance of radio waves for communication are slightly different from the case described above, this configuration allows us to use the reflect array even when the installation location of the reflect array 100 is a curved surface with a curvature, or when it is different from a flat surface.

Figure 15:
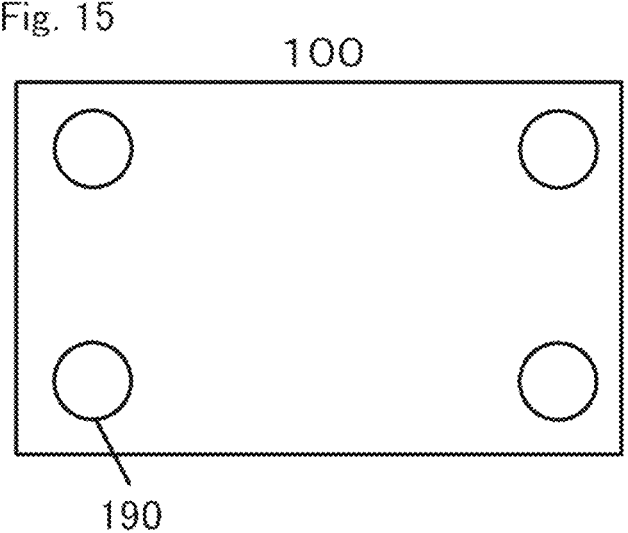
FIG. 15 shows a configuration of an example of a reflect array in one embodiment of the present invention.
Figure 16:
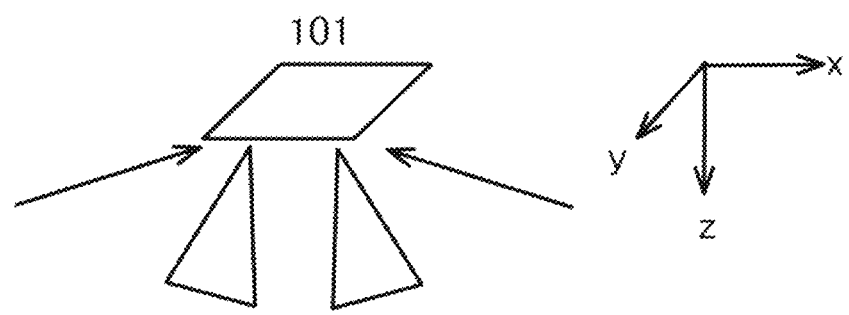
FIG. 16 shows a configuration of an example of a reflect array in one embodiment of the present invention.
Figure 17:
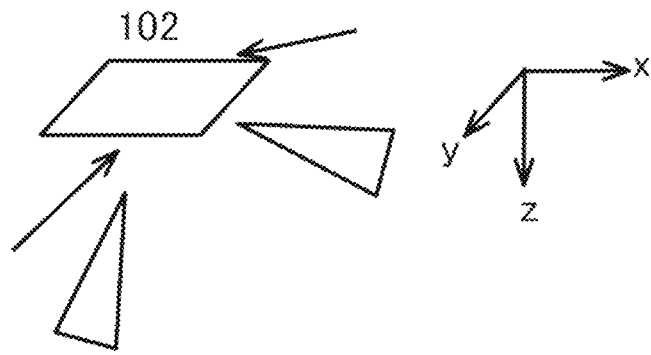
FIG. 17 shows a configuration of an example of a reflect array in one embodiment of the present invention.
Figure 18:
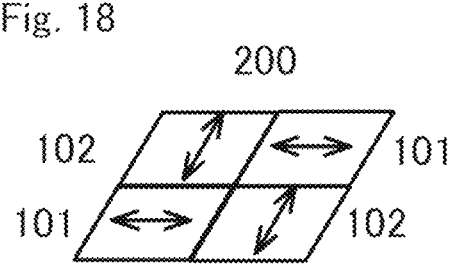
FIG. 18 shows a configuration of an example of a reflect array system in one embodiment of the present invention.

FIG. 15 shows a configuration example of a reflect array system 200 in one embodiment of the present invention.

The reflect array 100 has a fixing portion 190 that fixes the reflect array 100 to the outside such as another member or another substantially flat portion. In this embodiment, four fixed portions 190 are arranged at the four corners of the reflect array.

The fixing part 190 may be an affixing part. Alternatively, a mechanical fitting may be used. A screw thread or the like may also be used.

According to this configuration, the reflect array 100 can be easily installed on existing members such as indoor walls, ceilings, windows and doors.

FIGS. 16, 17, 18, 19, and 20 show configuration examples of the reflect array system 200 in one embodiment of the present invention.

In this embodiment, the reflect array system 200 has a plurality of the reflect arrays 100 described above.

An incidence-reflectance direction which is defined as direction of a line where the XY plane intersects with a plane that contains the two directions where the maximum incidence-reflectance is designed to occur. The reflect arrays with different incidence-reflectance directions from each other, are alternately arranged. The reflect arrays, with 90 degrees different incidence-reflectance directions from each other, are alternately arranged in FIG. 18. Needless to say, reflect arrays with 45 degrees different incidence-reflectance directions from each other, may be alternately arranged. In other case, reflect arrays with other angles, such as 60 degrees, different incidence-reflectance directions from each other, may be alternately arranged.

One type of the reflect array allows two directions of reflectance, but in this embodiment, the reflect arrays are rotated by 90 degrees from each other to form a checkboard type array such that four directions of reflectance are utilized. With this configuration, constraints of the directionality of the reflect array is relaxed, and it becomes possible to embed the reflector in advance in the ceiling material, since the directionality need not to be considered when the ceiling material is set up.

Figure 19:
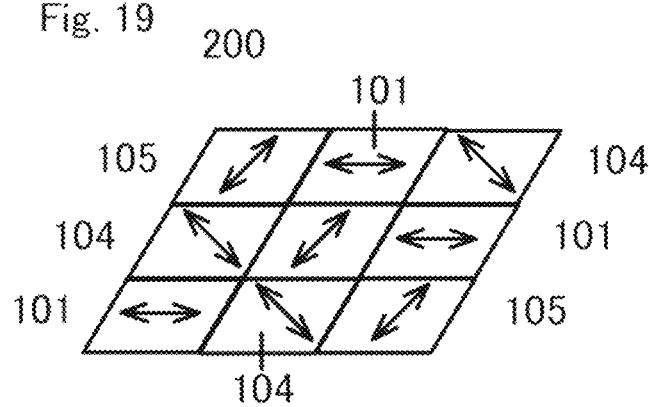
FIG. 19 shows a configuration of an example of a reflect array system in one embodiment of the present invention.

FIG. 19 shows a configuration example of a reflect array system 200 in one embodiment of the present invention. In this embodiment, three types of reflect arrays 101, 104, and 105 whose incoming/reflecting directions are different from each other by 60 degrees are arranged periodically. It should be noted that the phrase "alternately arranged" also includes such a configuration in which the elements are arranged periodically.

In this embodiment, the reflect array 101 has an incidence-reflectance direction in the X-axis direction. The reflect array 104 has an incidence-reflectance direction in the direction tilted +60 degrees from the X-axis direction in the XY plane, and the reflect array 105 has an incidence-reflectance direction in the direction tilted by −60 degrees from the X-axis direction in the XY plane.

Figure 20:
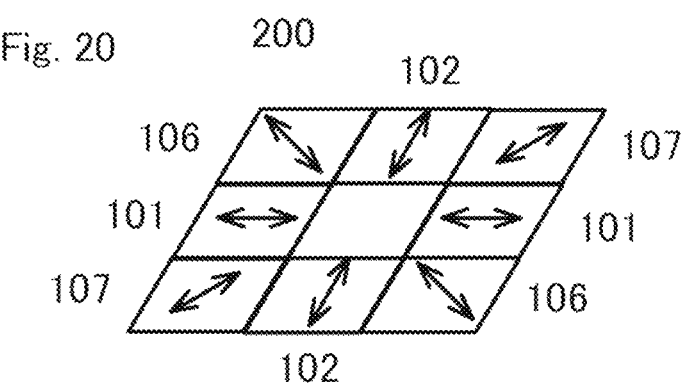
FIG. 20 shows a configuration of an example of a reflect array system in one embodiment of the present invention.

FIG. 20 shows a configuration example of a reflect array system 200 in one embodiment of the present invention.

In this embodiment, the reflect array system 200 has a plurality of the reflect arrays 100 described above.

A plurality of reflect arrays 101, 102, 106 and 107 are arranged in which the incidence-reflectance directions differ from each other by approximately a predetermined angle. The incidence-reflectance direction is defined as the line that intersects the XY plane and the plane including the two directions at that the maximum incidence-reflectance occurs. The incidence-reflectance directions rotate substantially by same degrees. In this embodiment, as indicated by the arrows in the drawing, the incidence-reflectance directions of the reflect arrays 101, 106, 102, and 107 are rotated by 45 degrees in the order of the XY plane.

For example, when radio waves for communication are transmitted within a range of 360 degrees around a stadium, there are many restrictions on the installation location, and it is necessary to adjust the base station 410 at the time of installation, making installation difficult. However, with this configuration, it is possible to easily install the apparatus with almost no restrictions on the installation location, and furthermore, it is possible to easily transmit radio waves for communication over a wide range such as 360 degrees.

Figure 21:
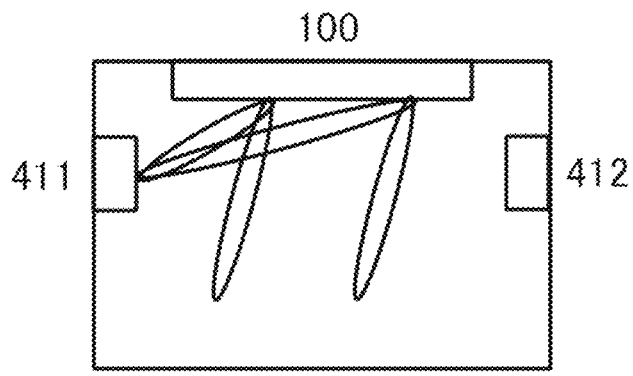
FIG. 21 shows a configuration of an example of a communication system in one embodiment of the present invention.
Figure 22:
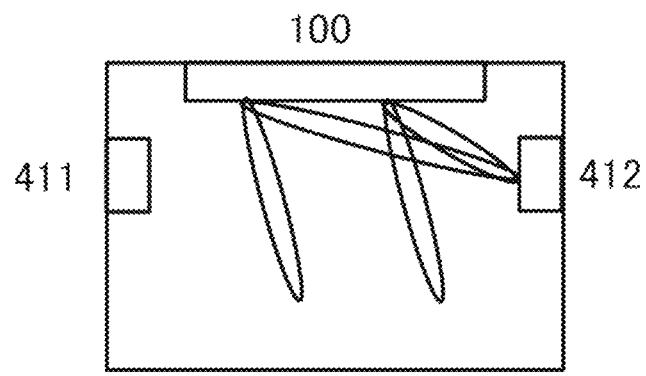
FIG. 22 shows a configuration of an example of a communication system in one embodiment of the present invention.

FIGS. 21 and 22 show a configuration example of a communication system 400 in one embodiment of the invention.

In this embodiment, the communication system 400 has multiple base stations and the reflect array 100 described above.

A reflect array 100 is installed between two base stations 411 and 412 of the plurality of base stations.

With this configuration, it is possible to enter and reflect in the opposite side of the designed incident angle in the negative direction in the X direction, that is, in the positive direction in the X direction. As a result, positive and negative incidence, in other words, both incident radio wave in the designed incidence angle and the incident radio wave in the designed reflection angle, can be effectively utilized. The installation location of the base station is often restricted. However, even if there is only one base station, according to the reflect array 100 of the present invention, the communication system 400 can be operated regardless of whether the base station 410 is installed at the position of the base station 411 or at the position of the base station 412.

In this configuration, the reflect array system 200, or reflector, can be installed even before the position of the base station 410 is determined.

Even if the position of the base station 410 is changed after the reflect array system 200, or reflector, is installed, it is not necessary to install again or relocate the reflect array system 200 or the reflection plate.

Figure 23:
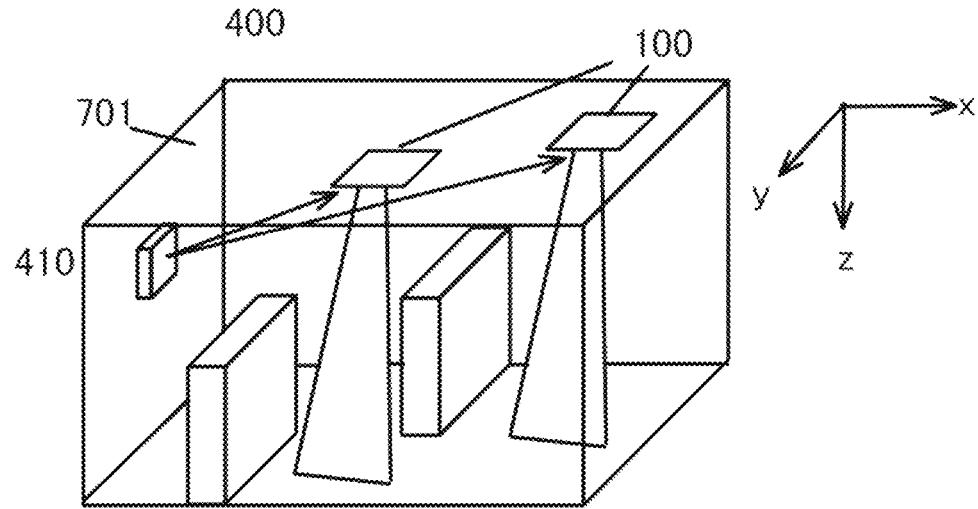
FIG. 23 shows a configuration of an example of a communication system in one embodiment of the present invention.

FIG. 23 shows a configuration example of a communication system 400 in one embodiment of the present invention.

In this embodiment, the communication system 400 has the base station 410 arranged on the wall surface 702 and the above-described reflect array 100 or the above-described reflect array system 200 is provided on the ceiling 701.

The support location of the base station 410 is not limited to the case mentioned above, as long as the base station 410 is configured to transmit communication radio waves coming from the direction of the wall surface 702. The base station 410 itself may be hung from the ceiling 701. These cases are also included in the configuration in which the "base station is placed on the wall".

When the base station 410 is installed on the wall surface 702, dead areas are likely to occur when communication waves are blocked by human bodies, machines, furniture, and the like.

In this configuration, a reflect array 100, that is, reflection plate, is installed on the ceiling 701 to reflect radio waves from above toward the dead area.

In some installation locations, it may be difficult to install the reflect array 100 or the reflect array system 200 on the ceiling 701, or the ceiling 701 may be too high to be suitable for installation.

The reflect array 100 and the reflect array system 200 of the present invention may also be installed on a wall surface in addition to the ceiling 701 if the installation location easily secures a line of sight between the reflect array 100, that is, reflecting plate, and the terminal, and is less susceptible to blocking.

Figure 24:
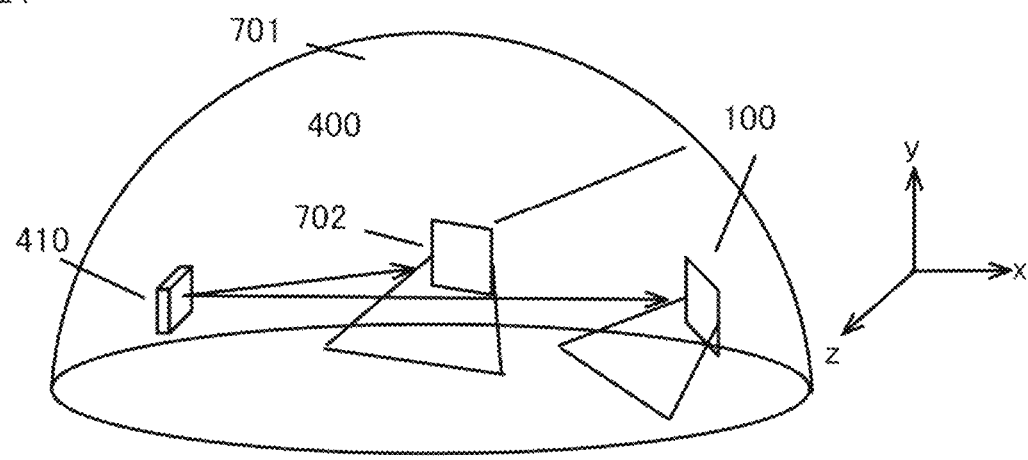
FIG. 24 shows a configuration of an example of a communication system in one embodiment of the present invention.

FIG. 24 shows a configuration example of a communication system 400 according to one embodiment of the present invention.

In this embodiment, the reflect array 100 described above or the reflect array system 200 described above is provided on the wall surface 702.

Figure 25:
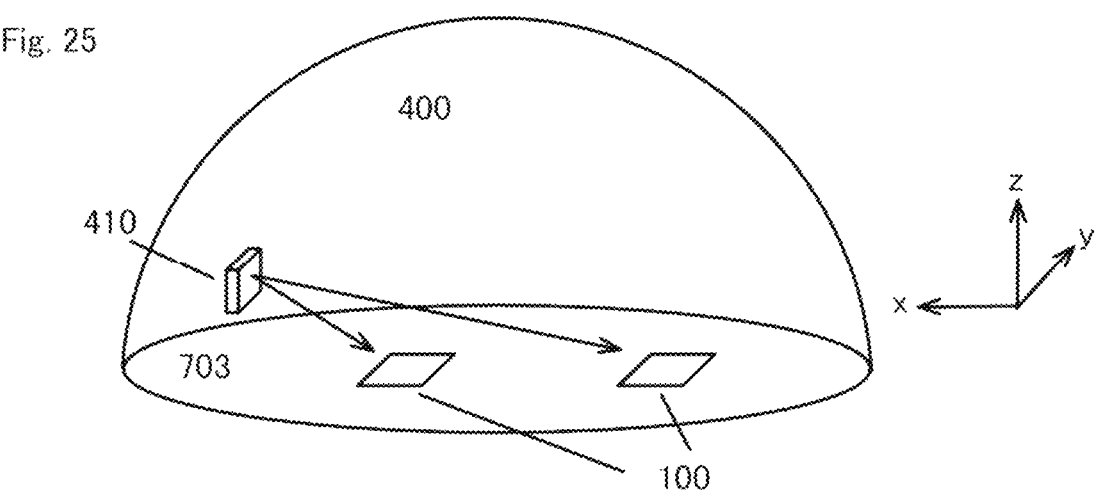
FIG. 25 shows a configuration of an example of a communication system in one embodiment of the present invention.

FIG. 25 shows a configuration example of a communication system 400 according to one embodiment of the present invention.

In this embodiment, the reflect array 100 described above, or the reflect array system 200 described above, is provided on the floor 703.

Figure 26:
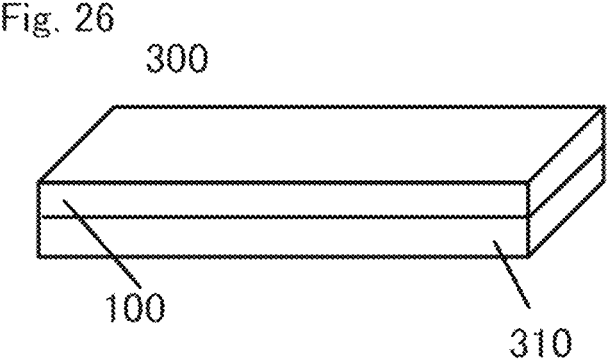
FIG. 26 shows a configuration of an example of a wall surface material with built-in reflect arrays in one embodiment of the present invention.
Figure 27:
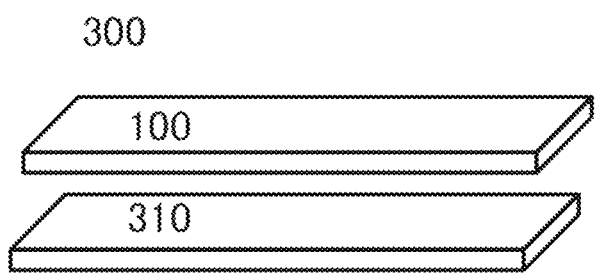
FIG. 27 shows a configuration of an example of a wall surface material with built-in reflect arrays in one embodiment of the present invention.

FIGS. 26 and 27 show a configuration example of a wall surface material 300 with a built-in reflect array according to one embodiment of the present invention. It should be noted that FIG. 27 shows an exploded view.

In this embodiment, the reflect array built-in wall surface material 300 has a base material 310 and the reflect array described above or the reflect array system 200 described above.

In this configuration, the reflect array is formed on the base material 310, but it is also possible to integrally form the reflect array or the reflect array system 200 and the base material 310.

Figure 28:
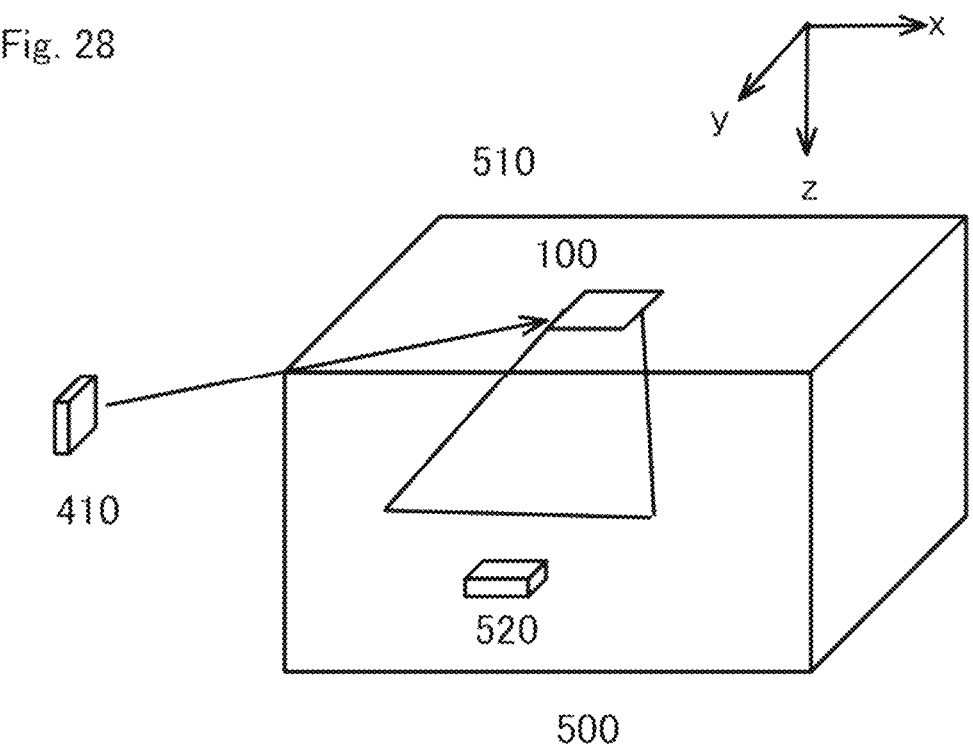
FIG. 28 shows a configuration of an example of a wall surface material with built-in reflect arrays in one embodiment of the present invention.

FIG. 28 shows a configuration example of a mobile communication system 500 in one embodiment of the present invention.

In this embodiment, the mobile communication system 500 has a mobile receiver 520 and the above-described reflect array 100 or the above-described reflect array system 200 inside the moving body 510.

For moving body 510 which can move at high speed, such as vehicles and aircrafts, the distance to the base station 410 is often long. Therefore, the angle at which the base station 410 is viewed from the mobile receiver 520 may become small.

According to this configuration, the reflect array 100 reflects the radio waves for communication inside the moving object, so that the radio waves for communication from the base station 410 can be reliably received.

It goes without saying that the present invention is not limited to the above-described embodiments and includes various embodiments without departing from the spirit and scope of the present invention.

EXPLANATION OF REFERENCE NUMERALS 100 to 107 reflect arrays
110 first element row
120 second element row
111 first element
121 second element
131 supercell
190 fixed part
200 reflect array system
300 wall material with built-in reflect array
310 base material
400 communication system
410, 411, 412 base stations
500 mobile communication system
510 moving body
520 mobile receiver
6 communication terminal
700 buildings
701 ceiling
702 wall
703 floor

The invention claimed is:

1. A reflect array comprising:
a plurality of first elements and second elements, arranged on XY plane, for three directions of X direction, Y direction, and Z direction, the three directions are orthogonal to each other,
the first elements are arranged in the Y direction to form a first element row,
the second elements are arranged in the Y direction to form a second element row, and
the first element row and the second element row are arranged alternately, wherein,
the two angles of the maximum incidence and the maximum reflectance are on the same positive or negative side of X-axis.

2. The reflect array according to claim 1, wherein one of two angles of the maximum incidence and the reflectance is 1 degree to 30 degrees, and the other is 60 degrees to 89 degrees, with respect to the Z axis.

3. The reflect array according to claim 1, wherein the reflect array being formed as a deformable sheet that are configured to change its form.

4. The reflect array according to claim 1, further comprising:
a fixing part for fixing the reflect array to outside of the reflect array.

5. A reflect array system comprising:
the multiple reflect arrays according to claim 1, wherein
for an incidence-reflectance direction which is defined as the direction of a line where the XY plane intersects with a plane that contains the two directions of the maximum incidence and the maximum reflectance,
the reflect arrays, with different incidence-reflectance directions from each other, are alternately arranged.

6. A reflect array system comprising:
multiple reflect arrays according to claim 1, wherein
for an incidence-reflectance direction which is defined as the direction of a line where the XY plane intersects with a plane that contains the two directions of the maximum incidence and the maximum reflectance,
the reflect arrays, with 90 degrees different incidence-reflectance directions from each other, are alternately arranged.

7. A reflect array system comprising:
multiple reflect arrays according to claim 1, wherein
for an incidence-reflectance direction which is defined as the direction of a line where the XY plane intersects with a plane that contains the two directions of the maximum incidence and the maximum reflectance,
the reflect arrays, with different incidence-reflectance directions from each other by a predetermined angle, are alternately arranged,
such that the incidence-reflectance directions of the reflect arrays differs by the predetermined angle.

8. A communication system comprising:
base stations, and
multiple reflect arrays according to claim 1, wherein
each reflect array is installed between two of the base stations.

9. A communication system comprising:
a base station is provided on a wall surface, wherein
multiple reflect arrays according to claim 1 are provided on a ceiling.

10. A communication system comprising:
a base station provided on a wall surface, wherein
multiple reflect arrays according to claim 1 are provided on a wall surface.

11. A communication system comprising:
a base station provided on a wall surface, wherein
multiple reflect arrays according to claim 1 are provided on a floor.

12. A wall material with a built-in reflect array comprising:
a base material, and
the reflect array according to claim 1.

13. A mobile communication system comprising:
a mobile receiver, and
the reflect array according to claim 1, installed in a mobile body.

* * * * *